(12) United States Patent
Otaka

(10) Patent No.: US 11,457,445 B2
(45) Date of Patent: Sep. 27, 2022

(54) COMMUNICATION SYSTEM, MANAGEMENT APPARATUS, AND COMPUTER-READABLE STORAGE MEDIUM FOR PREVENTING INTERFERENCE BETWEEN COMMUNICATION APPARATUSES

(71) Applicant: HONDA MOTOR CO., LTD., Tokyo (JP)

(72) Inventor: Masaru Otaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 16/828,976

(22) Filed: Mar. 25, 2020

(65) Prior Publication Data
US 2020/0314846 A1   Oct. 1, 2020

(30) Foreign Application Priority Data

Mar. 26, 2019  (JP) .............................. JP2019-058605

(51) Int. Cl.
*H04L 12/28*  (2006.01)
*H04W 72/04*  (2009.01)
*H04J 1/16*  (2006.01)

(52) U.S. Cl.
CPC .............................. *H04W 72/0453* (2013.01)

(58) Field of Classification Search
CPC ............. H04W 16/14; H04W 72/0453; H04W 72/082; H04W 74/0808; H04W 84/005; H04W 48/16; H04B 1/715
(Continued)

(56) References Cited

U.S. PATENT DOCUMENTS 10,149,176 B2 * 12/2018 Miyakawa ........ H04W 72/0446
2011/0021221 A1   1/2011 Kondo
(Continued)

FOREIGN PATENT DOCUMENTS

JP   2001061174 A   3/2001
JP   2011029988 A   2/2011
(Continued)

OTHER PUBLICATIONS

Office Action issued for counterpart Japanese Application No. 2019-058605, issued by the Japanese Patent Office on Mar. 15, 2022 (drafted on Mar. 9, 2022).
(Continued)

*Primary Examiner* — John Pezzlo

(57) ABSTRACT

Provided is a communication system, comprising: a duration time acquiring unit that acquires a first communication duration time, which is a communication duration time of a communication terminal in service of a first communication apparatus, and a second communication duration time, which is a communication duration time of a communication terminal in service of a second communication apparatus; a determining unit that determines whether or not a base station frequency band of the first communication apparatus and a base station frequency band of the second communication apparatus overlap; and a control unit that limits transmission of radio signals in the base station frequency band by the first communication apparatus or the second communication apparatus based on comparison between the first communication duration time and the second communication duration time when the determining unit determines that the base station frequency bands overlap.

11 Claims, 8 Drawing Sheets

(58) Field of Classification Search
USPC .......................................... 370/252, 329, 430
See application file for complete search history.

(56) References Cited

U.S. PATENT DOCUMENTS

| | | |
|---|---|---|
| 2013/0208618 A1 | 8/2013 | Nakano |
| 2016/0150461 A1* | 5/2016 | Oyama ................. H04W 24/10 370/328 |
| 2019/0364492 A1* | 11/2019 | Azizi .................... H04W 48/10 |
| 2019/0394653 A1 | 12/2019 | Abeysekera |
| 2020/0288372 A1* | 9/2020 | MacKenzie ....... H04W 36/0083 |
| 2021/0266963 A1* | 8/2021 | Noh .................... H04W 74/006 |

FOREIGN PATENT DOCUMENTS

| | | | |
|---|---|---|---|
| JP | 2012156976 A | 8/2012 | |
| JP | 2014017627 A | 1/2014 | |
| JP | 2016115959 A | 6/2016 | |
| JP | 2016127296 A | 7/2016 | |
| WO | 2012101680 A1 | 8/2012 | |
| WO | 2018139541 A1 | 8/2018 | |

OTHER PUBLICATIONS

Office Action issued for counterpart Japanese Application No. 2019-058605, issued by the Japanese Patent Office dated Jun. 28, 2022 (drafted on Jun. 22, 2022).

\* cited by examiner

150

| APPARATUS TYPE ||  BASE STATION FREQUENCY BAND |
|---|---|---|
| CLASSIFI-CATION | MANUFAC-TURER | |
| AUTOMOBILE | MANUFAC-TURER A | ××GHz~××GHz |
| AUTOMOBILE | MANUFAC-TURER B | ××GHz~××GHz |
| AUTOMOBILE | MANUFAC-TURER C | ××GHz~××GHz |
| ⋮ | ⋮ | ⋮ |

*FIG. 5*

COMMUNICATION SYSTEM, MANAGEMENT APPARATUS, AND COMPUTER-READABLE STORAGE MEDIUM FOR PREVENTING INTERFERENCE BETWEEN COMMUNICATION APPARATUSES

The contents of the following Japanese patent application are incorporated herein by reference: 2019-058605 filed in JP on Mar. 26, 2019

BACKGROUND

1. Technical Field

The present invention relates to a communication system, a management apparatus, and a computer-readable storage medium.

2. Related Art

There has been known a movable communication apparatus that functions as a base station (for example, see PTL 1).

PRIOR ART DOCUMENTS

Patent Documents

[PTL 1] Japanese Unexamined Patent Application Publication No. 2011-029988

SUMMARY

Technical Problem

It is desirable to provide a technology that can contribute to preventing interference between communication apparatuses.

BRIEF DESCRIPTION OF THE DRAWINGS

FIG. 5 schematically shows an example of an apparatus type frequency correspondence table 150.

DESCRIPTION OF EXEMPLARY EMBODIMENTS

Hereinafter, the present invention will be described through embodiments of the present invention, but the following embodiments do not limit the invention according to the claims. In addition, not all combinations of the features described in the embodiments are necessarily essential to the solution of the invention.

Figure 1:
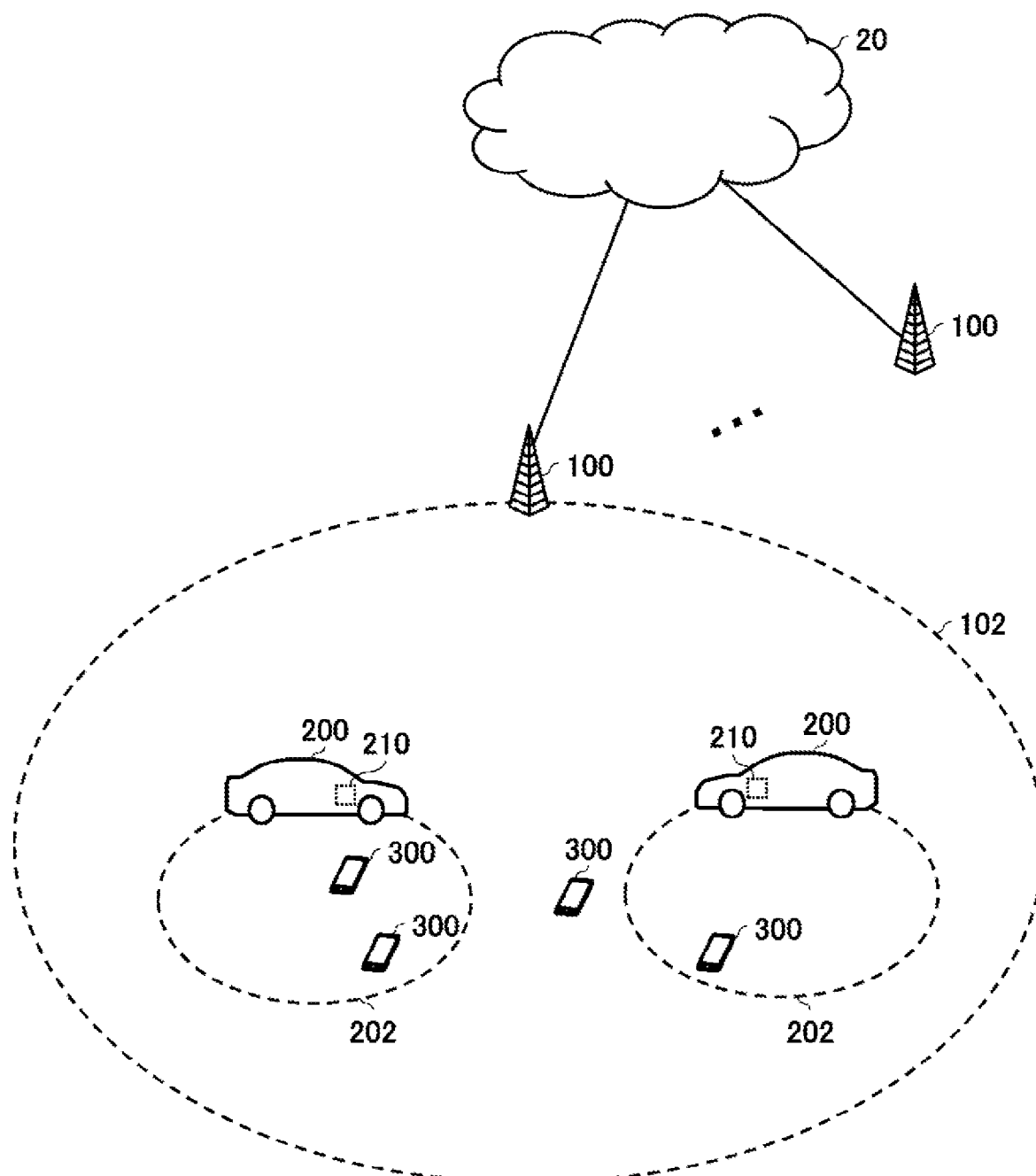
FIG. 1 schematically shows an example of a communication system 10.

FIG. 1 schematically shows an example of a communication system 10. The communication system 10 includes a plurality of vehicles 200. The vehicle 200 according to the present embodiment may function as a base station. The vehicle 200 may be referred to as a mobile base station. The vehicle 200 is capable of performing wireless communication with a wireless base station 100. The vehicle 200 is capable of performing wireless communication with a communication terminal 300. The vehicle 200 may relay communication between the wireless base station 100 and the communication terminal 300.

The vehicle 200 may be an automobile. The vehicle 200 may be any type of automobile as long as it has a wireless communication function. The vehicle 200 may be, for example, a gasoline vehicle or a so-called eco-car. Examples of the eco-car include an HV (Hybrid Vehicle), a PHEV/PHV (Plug-in Hybrid Vehicle), an EV (Electric Vehicle), and an FCV (Fuel Cell Vehicle). The vehicle 200 may be an automobile for any use. The vehicle 200 may be, for example, a private vehicle or a business vehicle such as a taxi and a bus.

The wireless base station 100 may conform to any mobile communication method. The wireless base station 100 conforms to, for example, a 3G (3rd Generation) communication method. The wireless base station 100 conforms to, for example, an LTE (Long Term Evolution) communication method. The wireless base station 100 may be an eNB (eNodeB). In addition, the wireless base station 100 may conform to, for example, a 5G (5th Generation) communication method. The wireless base station 100 may be a gNB (gNodeB). The wireless base station 100 may conform to a 6G (6th Generation) communication method or a later communication method.

The vehicle 200, for example, is in service of a wireless communication area 102 that is generated by the wireless base station 100, and performs wireless communication with the wireless base station 100. That the vehicle 200 is in service of the wireless communication area 102 that is generated by the wireless base station 100 may mean that the vehicle 200 is located inside of the wireless communication area 102 and has established wireless communication with the wireless base station 100.

The vehicle 200, for example, generates a wireless communication area 202 and performs wireless communication with the communication terminal 300 in service of the wireless communication area 202. The communication terminal 300 in service of the wireless communication area 202 may mean that the communication terminal 300 is located inside of the wireless communication area 202 and has established wireless communication with the vehicle 200. It is noted that the communication terminal 300 being in service of the wireless communication area 202 that is generated by the vehicle 200 may be described as the communication terminal 300 being in service of the vehicle 200.

The vehicle 200 may be capable of performing wireless communication with the communication terminal 300 in a base station frequency band for communication as a base station. The vehicle 200 may be an example of a communication apparatus. The base station frequency band used by the vehicle 200 may be described as a base station frequency band of the vehicle 200.

The base station frequency band of the vehicle 200 may be different depending on the vehicle 200. For example, the base station frequency band of the vehicle 200 differs depending on the settings of the vehicle 200. In addition, for example, the base station frequency band of the vehicle 200 differs depending on the type of the vehicle 200. As a specific example, the base station frequency band of the vehicle 200 differs depending on the manufacturer of the vehicle 200.

The vehicle 200 includes an in-vehicle device 210. The in-vehicle device 210 may perform wireless communication with the communication terminal 300 in the base station frequency band. The in-vehicle device 210 may be an example of a communication apparatus. The base station frequency band used by the in-vehicle device 210 may be described as the base station frequency band of the in-vehicle device 210.

The base station frequency band of the in-vehicle device 210 may differ depending on the in-vehicle device 210. For example, the base station frequency band of the vehicle 200 may differ depending on the settings of the in-vehicle device 210. In addition, for example, the base station frequency band of the in-vehicle device 210 may differ depending on the type of the in-vehicle device 210. As a specific example, the base station frequency band of the in-vehicle device 210 may differ depending on the manufacturer of the in-vehicle device 210.

The mobile communication method between the vehicle 200 and the communication terminal 300 may be the same as the mobile communication method between the vehicle 200 and the wireless base station 100. In addition, the mobile communication method between the vehicle 200 and the communication terminal 300 may be different from the mobile communication method between the vehicle 200 and the wireless base station 100.

The communication terminal 300 may be any communication terminal as long as it has a wireless communication function. The communication terminal 300 is, for example, a mobile phone such as a smartphone, a tablet terminal, a wearable terminal, and a PC (Personal Computer). In addition, the communication terminal 300 may be an IoT (Internet of Thing) terminal.

The vehicle 200 is capable of providing a wireless communication service to the communication terminal 300 located inside of the wireless communication area 202 that is generated by the vehicle 200 itself using the base station frequency band of the vehicle 200. However, for example, when a first vehicle 200 approaches a second vehicle 200 using the base station frequency band that at least partially overlaps with the base station frequency band of the first vehicle 200, there is a possibility that interference may occur and hinder wireless communication of the communication terminal 300.

The communication system 10 according to the present embodiment includes: a frequency acquiring unit that acquires the base station frequency band of the first vehicle 200 and the base station frequency band of the second vehicle 200; a duration time acquiring unit that acquires a first communication duration time, which is a communication duration time of a communication terminal in service of the first vehicle 200, and a second communication duration time, which is a communication duration time of a communication terminal in service of the second vehicle 200; a determining unit that determines whether or not the base station frequency band of the first vehicle 200 and the base station frequency band of the second vehicle 200 acquired by the frequency acquiring unit overlap; and a control unit that limits transmission of radio signals in the base station frequency band by the first vehicle 200 or the second vehicle 200 based on comparison between the first communication duration time and the second communication duration time when the determining unit determines that the base station frequency band of the first vehicle 200 and the base station frequency band of the second vehicle 200 overlap.

The frequency acquiring unit, the duration time acquiring unit, the determining unit, and the control unit are disposed, for example, inside of the wireless base station 100. The frequency acquiring unit, the duration time acquiring unit, the determining unit, and the control unit may be disposed inside of an apparatus that is disposed inside a core network 20. The apparatus disposed may differ for each communication method to be conformed to. For example, when the core network 20 conforms to the LTE communication method, the frequency acquiring unit, the duration time acquiring unit, the determining unit, and the control unit are disposed in, for example, an MME (Mobility Management Entity). In addition, for example, when the core network 20 conforms to the 5G communication method, the frequency acquiring unit, the duration time acquiring unit, the determining unit, and the control unit are disposed in, for example, an AMF (Access and Mobility management Function) or an SMF (Session Management Function). The frequency acquiring unit, the duration time acquiring unit, the determining unit, and the control unit may be separately disposed in the wireless base station 100 and the apparatus disposed inside of the core network 20.

Here, a case where the frequency acquiring unit, the duration time acquiring unit, the determining unit, and the control unit are disposed inside of the wireless base station 100 will be mainly described as an example. The wireless base station 100 may be an example of a management apparatus that manages the plurality of vehicles 200.

The wireless base station 100, for example, monitors the positions of the plurality of vehicles 200, and acquires the base station frequency band of the first vehicle 200 and the base station frequency band of the second vehicle 200 when the distance between the first vehicle 200 and the second vehicle 200 among the plurality of vehicles 200 is shorter than a predetermined distance. The predetermined distance is determined, for example, according to the size of the wireless communication area 202 that is generated by the vehicle 200.

The wireless base station 100 acquires, for example, the base station frequency band used when the vehicle 200 is currently communicating as a base station. In addition, the wireless base station 100 may acquire the base station frequency band from base station frequency band information transmitted as one of the parameters from the vehicle 200 during communication as a base station. In addition, the wireless base station 100 may acquire the base station frequency band corresponding to the type of the vehicle 200 from association information in which the type of the vehicle 200 and the base station frequency band used by the vehicle 200 are associated with.

The wireless base station 100 acquires the communication duration time of the communication terminal 300 in service of the vehicle 200. The wireless base station 100 may receive, from the vehicle 200, the communication duration time of the communication terminal 300 in service of the vehicle 200. The wireless base station 100 may acquire the communication duration time of each of all of the communication terminals 300 in service of the vehicle 200. The wireless base station 100 may acquire the average of the communication duration times of all of the communication terminals 300 in service of the vehicle 200. The wireless base station 100 may acquire a first communication duration time, which is the communication duration time of the communication terminal 300 in service of the first vehicle 200, and a second communication duration time, which is the communication duration time of the communication terminal in service of the second vehicle 200.

The wireless base station 100 determines whether or not the base station frequency band of the first vehicle 200 and the base station frequency band of the second vehicle 200 overlap. When the wireless base station 100 determines that they overlap, the wireless base station 100 limits transmission of radio signals in the base station frequency band by the first vehicle 200 or the second vehicle 200 based on comparison between the first communication duration time and the second communication duration time. Limiting transmission of radio signals may mean stopping transmission of radio signals. In addition, limiting transmission of radio signals may mean reducing transmission output of radio signals.

For example, the wireless base station 100 limits transmission of radio signals in the base station frequency band by the second vehicle 200 when the second communication duration time is shorter than the first communication duration time, and limits transmission of radio signals in the base station frequency band by the first vehicle 200 when the second communication duration time is longer than the first communication duration time. This makes it possible to, for example, reduce the possibility that when a plurality of communication terminals 300 are downloading data via the vehicle 200, communication of the communication terminal 300 in which the communication duration time is longer and most of the data has been downloaded is disconnected, and thus the user experience quality is greatly reduced.

When the wireless base station 100 determines that the base station frequency band of the first vehicle 200 and the base station frequency band of the second vehicle 200 overlap and is to limit transmission of radio signals in the base station frequency band by the second vehicle 200, the wireless base station 100 may, for example, limit transmission of radio signals by the second vehicle 200 in the part of the base station frequency band of the second vehicle 200 that overlaps with the base station frequency band of the first vehicle 200. This, as long as the band used by the first vehicle 200 does not change, makes it possible to prevent the wireless communication of the first vehicle 200 and the wireless communication of the second vehicle 200 from interfering with each other.

When the wireless base station 100 determines that the base station frequency band of the first vehicle 200 and the base station frequency band of the second vehicle 200 overlap and is to limit transmission of radio signals in the base station frequency band by the second vehicle 200, the wireless base station 100 may limit transmission of radio signals in the entire base station frequency band by the second vehicle 200. This, even if the band used by the first vehicle 200 changes, makes it possible to prevent interference between the first vehicle 200 and the second vehicle 200 from occurring.

Figure 2:
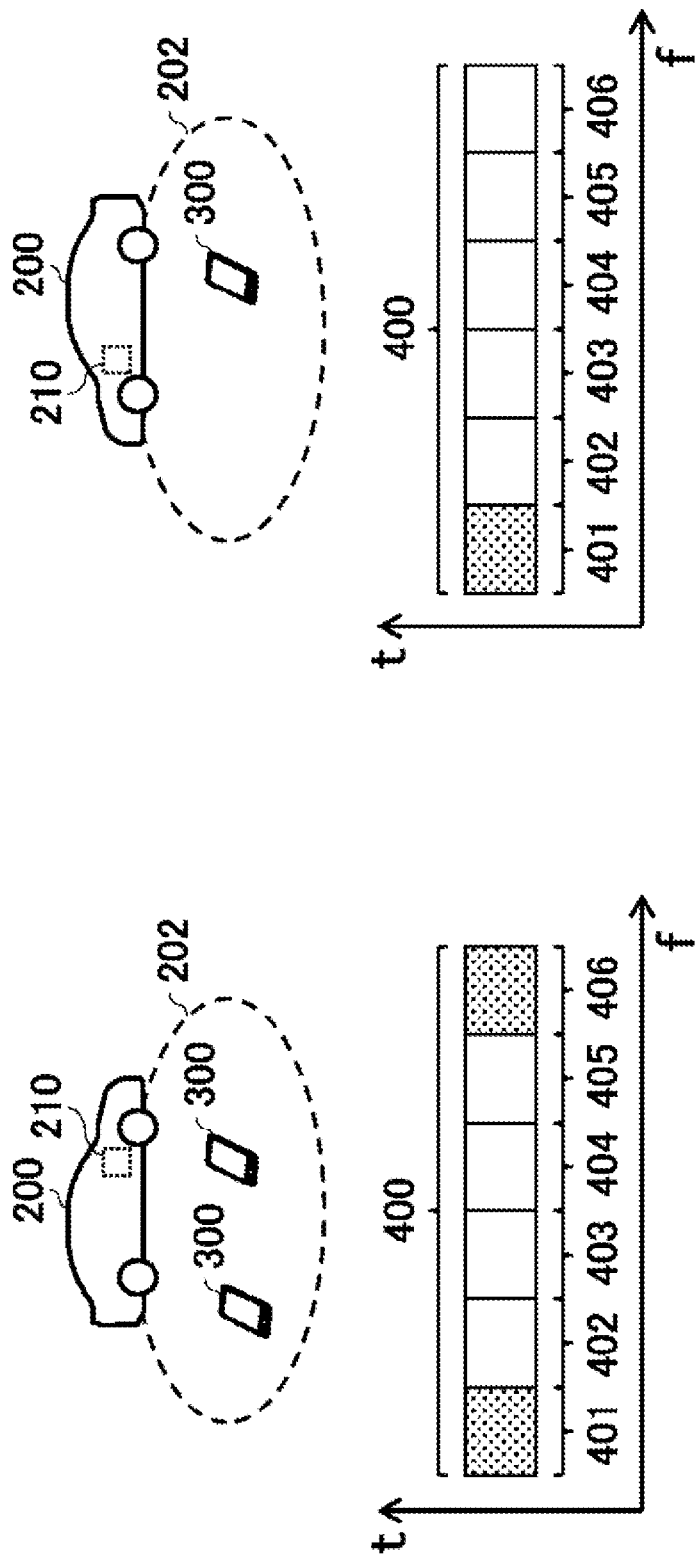
FIG. 2 schematically shows an example of a wireless resource block allocation status to a communication terminal 300 of each of the two vehicles 200.

FIG. 2 schematically shows an example of a status of wireless resource block allocation to the communication terminal 300 of each of the two vehicles 200. Here, an example is shown of the allocation status at a certain timing of six wireless resource blocks 401, 402, 403, 404, 405, and 406 when the communication method is the LTE communication method and a base station frequency band 400 of the two vehicles 200 is 1.4 MHz.

In the example shown in FIG. 2, among the two vehicles 200, two communication terminals 300 are in service of the first vehicle 200, and one communication terminal 300 is in service of the second vehicle 200. The first vehicle 200 allocates the wireless resource block 401 and the wireless resource block 406 to the two communication terminals 300, and the second vehicle 200 allocates the wireless resource block 406 to the one communication terminal 300.

For example, when the distance between the first vehicle 200 and the second vehicle 200 is shorter than a predetermined distance, the wireless base station 100 stops transmission of radio signals in the entire base station frequency band 400 by the second vehicle 200. This, even if the first vehicle 200 subsequently allocates any wireless resource block in the base station frequency band 400 to the communication terminal 300, makes it possible to prevent interference between the first vehicle 200 and the second vehicle 200 from occurring.

Figure 3:
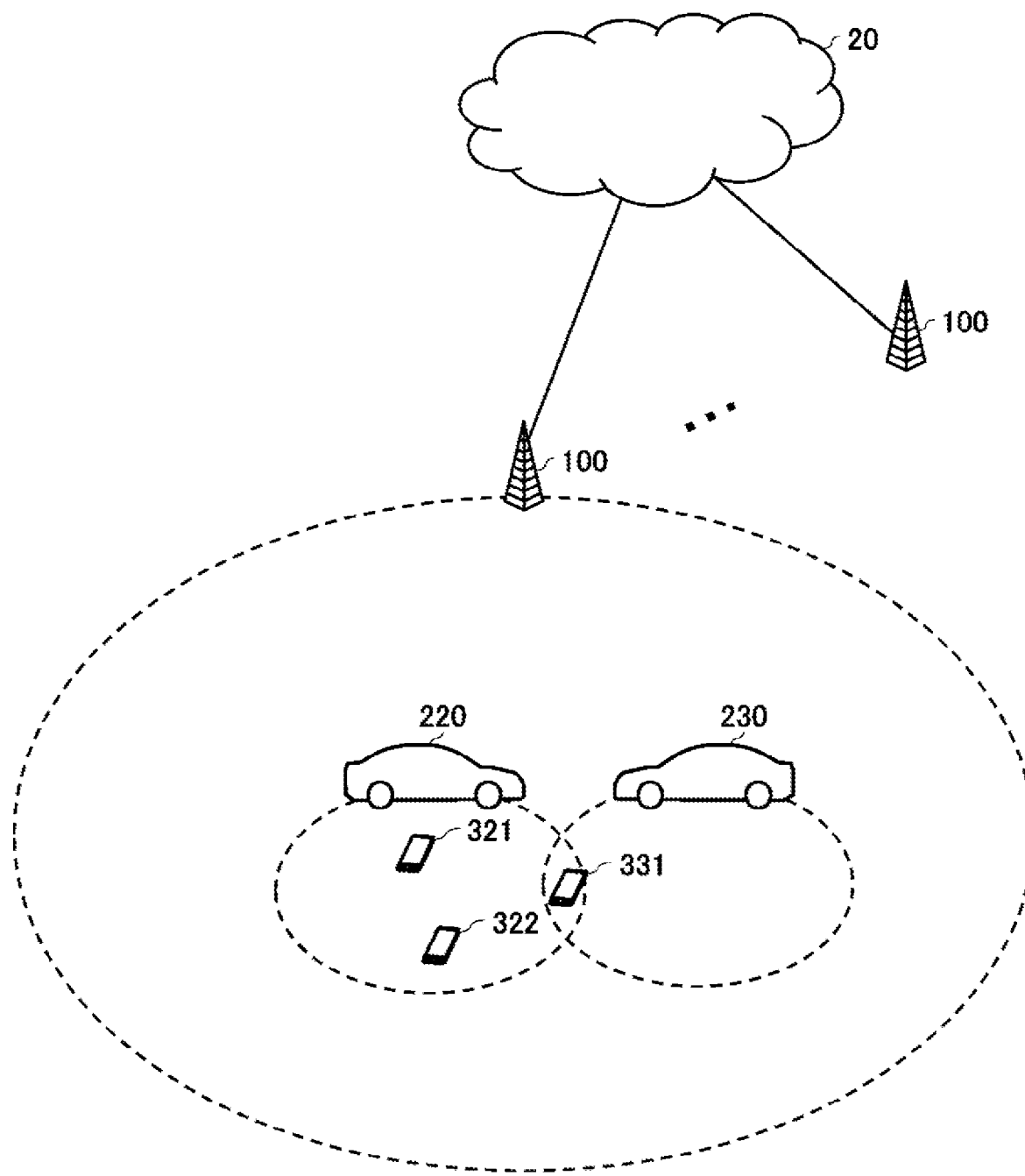
FIG. 3 schematically shows an example of the communication system 10.

FIG. 3 is an explanatory diagram showing an example of processing performed by the wireless base station 100 when a vehicle 220 is traveling in a direction of a vehicle 230. In the example shown in FIG. 3, a communication terminal 321 and a communication terminal 322 are in service of the vehicle 220, and a communication terminal 331 is in service of the vehicle 230. The vehicle 220 and the vehicle 230 have the same configuration as that of the vehicle 200, and the communication terminal 321, the communication terminal 322, and the communication terminal 331 have the same configuration as that of the communication terminal 300.

When stopping transmission of radio signals in the base station frequency band by the vehicle 230, the wireless base station 100 may hand over the communication terminal 331 in service of the vehicle 230 to a wireless communication area that is generated by the vehicle 220, and then stop transmission of radio signals in the base station frequency band by the vehicle 230. This makes it possible to prevent the communication connection of the communication terminal 331 from being disconnected. As a method of handing over the communication terminal 331 to the wireless communication area that is generated by the vehicle 220, any known method such as a change of a handover threshold value or a non-measurement handover can be adopted.

Figure 4:
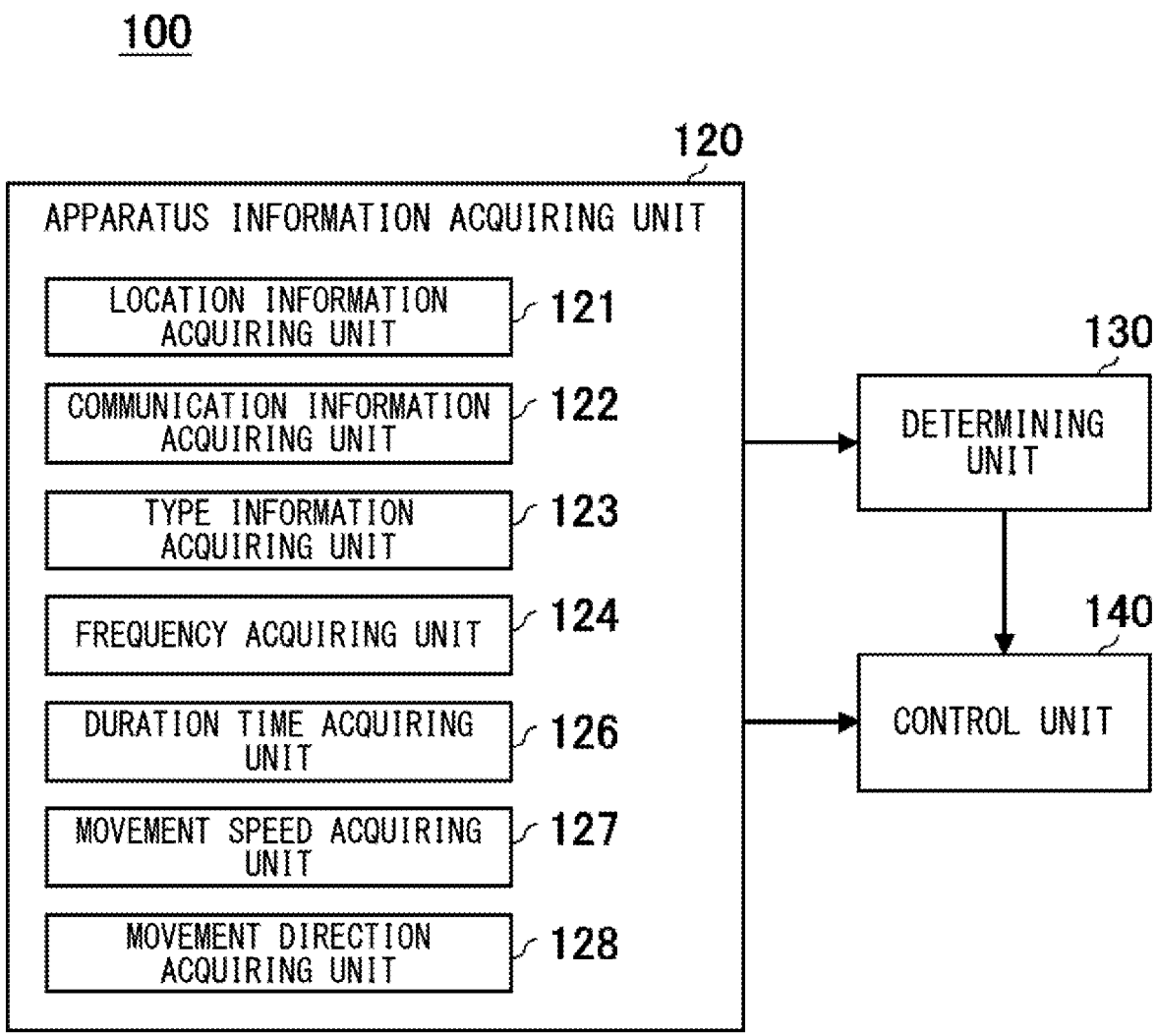
FIG. 4 schematically shows an example of a functional configuration of a wireless base station 100.

FIG. 4 schematically shows an example of a functional configuration of the wireless base station 100. The wireless base station 100 includes an apparatus information acquiring unit 120, a determining unit 130, and a control unit 140.

The apparatus information acquiring unit 120 acquires information of the communication apparatus in service of the wireless base station 100. The apparatus information acquiring unit 120 acquires, for example, information of the vehicle 200 in service of the wireless base station 100.

The apparatus information acquiring unit 120 includes a location information acquiring unit 121, a communication information acquiring unit 122, a type information acquiring unit 123, a frequency acquiring unit 124, a duration time acquiring unit 126, a movement speed acquiring unit 127, and a movement direction acquiring unit 128. It is noted that it is not always necessary that the apparatus information acquiring unit 120 has all of these configurations.

The location information acquiring unit 121 acquires the location information of the communication apparatus. The location information acquiring unit 121 acquires, for example, the location information of the vehicle 200. The location information acquiring unit 121 may receive the location information of the vehicle 200 from the vehicle 200.

The communication information acquiring unit 122 acquires the communication information relating to communication between the communication apparatus and the communication terminal 300. The communication information acquiring unit 122 acquires, for example, the communication information relating to communication between the vehicle 200 and the communication terminal 300. The communication information acquiring unit 122 acquires, for example, the communication information transmitted from the vehicle 200 to the wireless base station 100 during communication with the wireless base station 100. The communication information may include the base station frequency band of the vehicle 200.

The type information acquiring unit 123 acquires the type information indicating the type of the communication apparatus. The type information may include the classification of the communication apparatus. Examples of the classification of the communication apparatus include automobiles and unmanned aerial vehicles such as drones. The type information includes the manufacturer of the communication apparatus. The type information acquiring unit 123 acquires, for example, the type information transmitted from the communication apparatus to the wireless base station 100 during communication with the wireless base station 100. The type information acquiring unit 123 may acquire the type information transmitted from the vehicle 200 to the wireless base station 100 during communication with the wireless base station 100.

The frequency acquiring unit 124 acquires the base station frequency band of the communication apparatus. The frequency acquiring unit 124 acquires, for example, the base station frequency band of the vehicle 200. The frequency acquiring unit 124 acquires, for example, the base station frequency band of the vehicle 200 when the vehicle 200 is currently communicating as a base station. When the vehicle 200 is in service of the wireless base station 100 and is providing a relay service for relaying communication between the wireless base station 100 and the communication terminal 300, the wireless base station 100 manages the base station frequency band that is used by the vehicle 200. The frequency acquiring unit 124 may refer to the base station frequency band that is managed by the wireless base station 100.

The frequency acquiring unit 124 may acquire the base station frequency band included in the communication information acquired by the communication information acquiring unit 122. For example, when the vehicle 200 is not currently communicating as a base station, the frequency acquiring unit 124 acquires the base station frequency band from the communication information acquired and stored by the communication information acquiring unit 122. When the vehicle 200 is currently communicating as a base station, the frequency acquiring unit 124 may acquire the base station frequency band from the communication information acquired and stored by the communication information acquiring unit 122.

The frequency acquiring unit 124 may acquire the base station frequency band using the type information acquired by the type information acquiring unit 123. The frequency acquiring unit 124 may, for example, preliminarily store association data in which the type information is associated with the base station frequency band, and, by referring to the association data, acquire the base station frequency band corresponding to the type information acquired by the type information acquiring unit 123. For example, when the vehicle 200 is not currently communicating as a base station, the frequency acquiring unit 124 acquires the base station frequency band using the type information acquired and stored by the type information acquiring unit 123. When the vehicle 200 is currently communicating as a base station, the frequency acquiring unit 124 may acquire the base station frequency band using the type information acquired and stored by the type information acquiring unit 123.

The frequency acquiring unit 124 acquires, for example, the base station frequency band of two vehicles 200 among the plurality of vehicles 200 when the distance between the two vehicles 200 is shorter than a predetermined distance.

The duration time acquiring unit 126 acquires the communication duration time of the communication terminal 300 in service of the vehicle 200. The duration time acquiring unit 126 may receive, from the vehicle 200, the communication duration time of the communication terminal 300 in service of the vehicle 200. The duration time acquiring unit 126 may acquire each communication duration time of all of the communication terminals 300 in service of the vehicle 200. The duration time acquiring unit 126 may acquire the average of the communication duration times of all of the communication terminals in service of the vehicle 200.

The movement speed acquiring unit 127 acquires the movement speed of the vehicle 200. The movement speed acquiring unit 127 may receive the movement speed of the vehicle 200 from the vehicle 200. The vehicle 200 transmits, for example, in response to an inquiry from the wireless base station 100, the movement speed of the vehicle 200 at the time of receiving the inquiry. In addition, the vehicle 200 may transmit the average movement speed of the vehicle 200 to the wireless base station 100 from the time when the inquiry is received to a time that is a predetermined amount of time earlier.

The movement direction acquiring unit 128 acquires the movement direction of the vehicle 200. The movement direction acquiring unit 128 may receive the movement direction of the vehicle 200 from the vehicle 200. For example, in response to an inquiry from the wireless base station 100, the vehicle 200 transmits the direction in which the vehicle 200 is traveling when the inquiry is received to the wireless base station 100 as the movement direction. In addition, for example, the vehicle 200 transmits route information managed by a navigation system that is mounted on the vehicle 200 to the wireless base station 100 as the movement direction.

The determining unit 130 determines whether or not the base station frequency bands of a plurality of vehicles 200 in service of the wireless base station 100 overlap. The determining unit 130 determines, for example, whether or not the base station frequency band of the first vehicle 200 acquired by the frequency acquiring unit 124 and the base station frequency band of the second vehicle 200 acquired by the frequency acquiring unit 124 overlap. The determining unit 130 may determine that the base station frequency band of the first vehicle 200 and the base station frequency band of the second vehicle 200 overlap when any part thereof are overlapped.

The control unit 140 limits transmission of radio signals in the base station frequency band by the vehicle 200 when the determining unit 130 determines that the base station frequency bands overlap. The control unit 140 limits, for example, transmission of radio signals in the base station frequency band by the second vehicle 200 when it is determined that the base station frequency band of the first vehicle 200 and the base station frequency band of the second vehicle 200 overlap.

The control unit 140 limits, for example, transmission of radio signals in the base station frequency band by the first vehicle 200 or the second vehicle 200 based on comparison between the communication duration time of the communication terminal 300 in service of the first vehicle 200 and the communication duration time of the communication terminal 300 in service of the second vehicle 200, when it is determined that the base station frequency band of the first vehicle 200 and the base station frequency band of the second vehicle 200 overlap. For example, the control unit 140 limits transmission of radio signals in the base station frequency band by the second vehicle 200 when the communication duration time of the communication terminal 300 in service of the second vehicle 200 is shorter than the communication duration time of the communication terminal 300 in service of the first vehicle 200, and limits transmission of radio signals in the base station frequency band by the first vehicle 200 when the communication duration time of the communication terminal 300 in service of the second vehicle 200 is longer than the communication duration time of the communication terminal 300 in service of the first vehicle 200. As a result, for example, in a case where a plurality of communication terminals 300 are downloading data via the vehicle 200, it is possible to reduce the possibility of communication of the communication terminal 300 in which the communication duration time is longer and most of the data has been downloaded being disconnected, and the user experience quality being greatly reduced.

The control unit 140, for example, stops transmission of radio signals in the base station frequency band by the second vehicle 200 when limiting the transmission of radio signals in the base station frequency band by the second vehicle 200. In addition, the control unit 140, for example, reduces the transmission output of radio signals in the base station frequency band by the second vehicle 200 when limiting transmission of radio signals in the base station frequency band by the second vehicle 200. The control unit 140, for example, limits transmission of radio signals in the entire base station frequency band by the second vehicle 200 when limiting transmission of radio signals in the base station frequency band by the second vehicle 200.

The control unit 140 may limit transmission of radio signals in the base station frequency band by the second vehicle 200 when the distance between two vehicles 200 among a plurality of vehicles 200 in service of the wireless base station 100 is shorter than a predetermined distance, and it is determined that the base station frequency band of the first vehicle 200 and the base station frequency band of the second vehicle 200 among the two vehicles 200 overlap. As a result, it is possible to prevent the wireless communication of the first vehicle 200 with the communication terminal 300 in the base station frequency band from interfering with radio signals transmitted from the second vehicle 200. In this case, the control unit 140 may release the limiting of transmission of radio signals in the base station frequency band by the second vehicle 200 in response to the distance between the first vehicle 200 and the second vehicle 200 becoming longer than the predetermined distance.

When the distance between two vehicles 200 among a plurality of vehicles 200 in service of the wireless base station 100 becomes shorter than a predetermined distance, the determining unit 130 may determine whether or not the base station frequency band of the first vehicle 200 and the base station frequency band of the second vehicle 200 among the two vehicles 200 overlap. For example, the determining unit 130 determines that the base station frequency band of the first vehicle 200 and the base station frequency band of the second vehicle 200 overlap when at least some of a plurality of wireless resource blocks assigned by the first vehicle 200 to the communication terminal 300 in service of the wireless communication area 202 that is generated by the first vehicle 200 overlap with a plurality of wireless resource blocks assigned by the second vehicle 200 to the communication terminal 300 in service of the wireless communication area 202 that is generated by the second vehicle 200.

The control unit 140, when limiting transmission of radio signals in the base station frequency band by the second vehicle 200, may hand over the communication terminal 300 in service of the wireless communication area 202 that is generated by the second vehicle 200 to the wireless communication area 202 that is generated by the first vehicle 200, and then limit transmission of radio signals in the base station frequency band by the second vehicle 200. As a result, it is possible to prevent communication of the communication terminal 300 in service of the second vehicle 200 from being disconnected when limiting transmission of radio signals in the base station frequency band by the second vehicle 200.

When the determining unit 130 determines that the base station frequency band of the first vehicle 200 and the base station frequency band of the second vehicle 200 overlap, the control unit 140 may limit transmission of radio signals in the base station frequency band by the second vehicle 200 when the vehicle 200 satisfies a predetermined condition, and limit transmission of radio signals in the base station frequency band by the first vehicle 200 when the second vehicle 200 does not satisfy the predetermined condition. When the distance between the first vehicle 200 and the second vehicle 200 is shorter than a predetermined distance and the determining unit 130 determines that the base station frequency bands overlap, the control unit 140 may limit transmission of radio signals in the base station frequency band by the second vehicle 200 when the second vehicle 200 satisfies a predetermined condition, and limit transmission of radio signals in the base station frequency band by the first vehicle 200 when the second vehicle 200 does not satisfy the predetermined condition.

The control unit 140 may limit transmission of radio signals in the base station frequency band by the second vehicle 200 when the movement speed of the second vehicle 200 is faster than the movement speed of the first vehicle 200, and limit transmission of radio signals in the base station frequency band by the first vehicle 200 when the movement speed of the second vehicle 200 is slower than the movement speed of the first vehicle 200. As a result, it is possible to maintain wireless communication in the base station frequency band of the vehicle 200, among the first vehicle 200 and the second vehicle 200, that has a slower movement speed and a higher probability of having a higher quality of wireless communication with the communication terminal 300.

When it is determined from the movement direction of the first vehicle 200 and the movement direction of the second vehicle 200 that the first vehicle 200 and the second vehicle 200 are not approaching each other, the control unit 140 may not limit transmission of radio signals in the base station frequency band by any of the first vehicle 200 and the second vehicle 200 even if the distance between the first vehicle 200 and the second vehicle 200 is shorter than a predetermined distance and the determining unit 130 determines that the base station frequency bands overlap.

FIG. 5 schematically shows an example of an apparatus type frequency correspondence table 150. The frequency acquiring unit 124 may acquire the base station frequency band of the communication apparatus from the type information acquired by the type information acquiring unit 123 and from the apparatus type frequency correspondence table 150.

The apparatus type and the base station frequency band are registered in the apparatus type frequency correspondence table 150 with them being associated with each other. In the example shown in FIG. 5, base station frequency bands are associated respectively with an automobile of a manufacturer A, an automobile of a manufacturer B, and an automobile of a manufacturer C. The number of manufacturers is not limited to this, and any number can be registered. In addition, the classification is not limited to automobiles, and unmanned aerial vehicles and the like may be registered.

Figure 6:
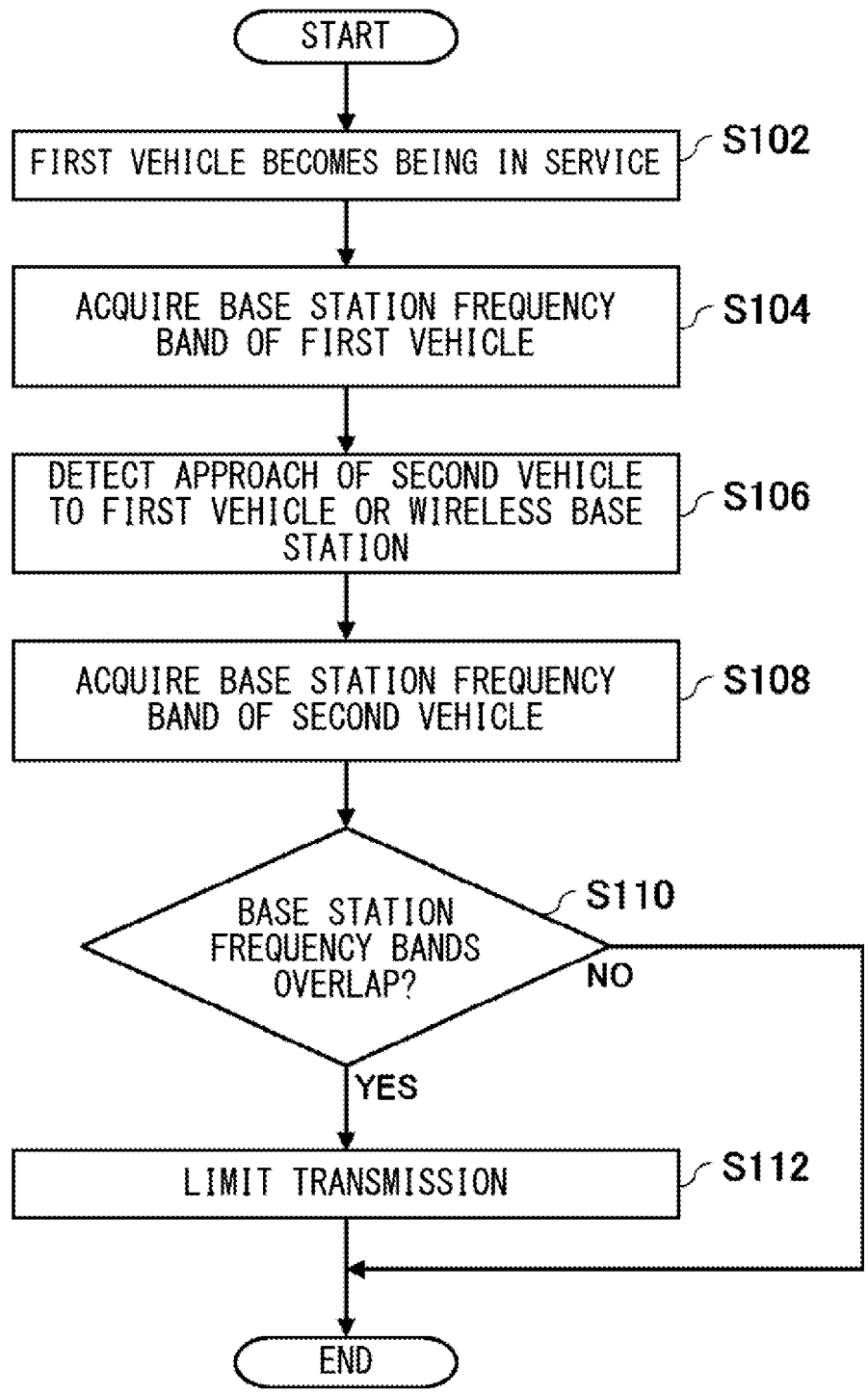
FIG. 6 schematically shows an example of a flow of processing by the wireless base station 100.

FIG. 6 schematically shows an example of a flow of processing by the wireless base station 100. Here, the flow of processing by the wireless base station 100 when the second vehicle 200 approaches the first vehicle 200 or the wireless base station 100 after the first vehicle 200 is in service of the wireless base station 100 is schematically described.

In step 102 (step may be abbreviated as S), the first vehicle 200 becomes being in service of the wireless base station 100. In S104, the frequency acquiring unit 124 acquires the base station frequency band of the first vehicle 200.

In S106, the determining unit 130 detects the approach of the second vehicle 200 to the first vehicle 200 or the wireless base station 100. The determining unit 130 may determine, from the location information of the first vehicle 200 and the location information of the second vehicle 200 acquired appropriately by the location information acquiring unit 121, that the first vehicle 200 and the second vehicle 200 have approached each other when the determining unit 130 determines that the distance between the first vehicle 200 and the second vehicle 200 is shorter than a predetermined threshold. In addition, the determining unit 130 may determine, from the location information of the wireless base station 100 and the location information, acquired appropriately by the location information acquiring unit 121, of the second vehicle 200, that the second vehicle 200 and the wireless base station 100 have approached each other when the determining unit 130 determines that the distance between the second vehicle 200 and the wireless base station 100 is shorter than a predetermined distance.

In S108, the frequency acquiring unit 124 acquires the base station frequency band of the second vehicle 200. In S110, the determining unit 130 determines whether or not the base station frequency band of the first vehicle 200 acquired in S104 and the base station frequency band of the second vehicle 200 acquired in S108 overlap. When it is determined that the base station frequency bands overlap, the process moves to S112.

In S112, the control unit 140 limits transmission of radio signals in the base station frequency band by the second vehicle 200. After the first vehicle 200 and the second vehicle 200 have approached each other, the control unit 140 may release the limiting in response to the distance between the first vehicle 200 and the second vehicle 200 becoming longer than the threshold. In addition, when the second vehicle 200 and the wireless base station 100 have approached each other, the control unit 140 may release the limiting in response to the distance between the second vehicle 200 and the wireless base station 100 becoming longer than the threshold. When it is determined in S110 that the base station frequency bands do not overlap, the communication system 100 may end the processing for the second vehicle 200 and continue monitoring of the approach of another vehicle 200 to the first vehicle 200 or the wireless base station 100. By execution of the processing as shown in FIG. 6 by the wireless base station 100, it is possible to prioritize the base station function of the first vehicle 200 in service of the wireless base station 100 earlier.

Figure 7:
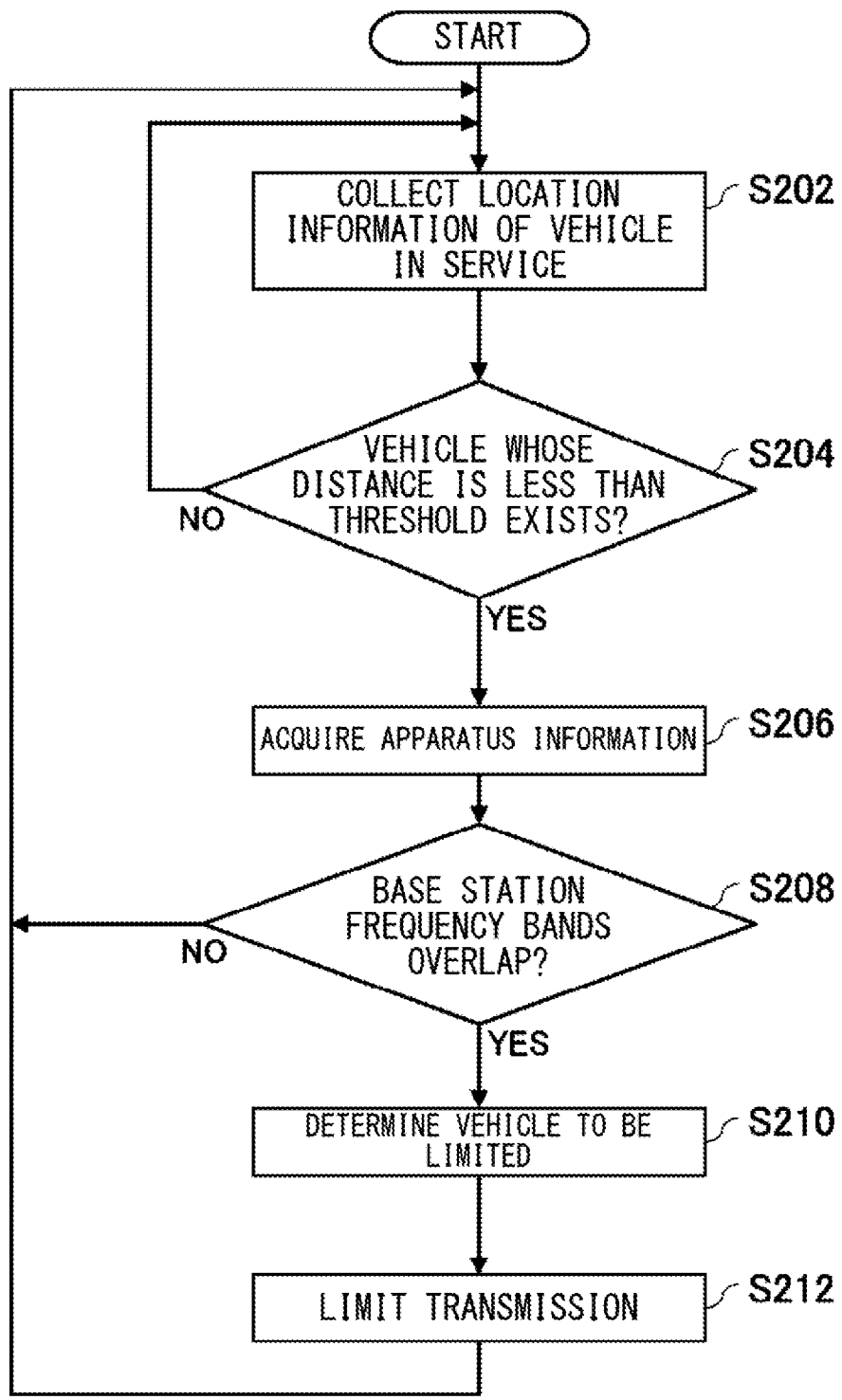
FIG. 7 schematically shows an example of a flow of processing by the wireless base station 100.

FIG. 7 schematically shows an example of a flow of processing by the wireless base station 100. Here, a state in which the wireless base station 100 monitors the distance between a plurality of vehicles 200 in service of the wireless base station 100 will be described as a start state.

In S202, the determining unit 130 collects the location information of the vehicles 200 in service of the wireless base station 100. In S204, the determining unit 130 determines whether or not two vehicles 200, among the plurality of vehicles 200, in which the distance between the vehicles 200 is shorter than a threshold exist. When it is determined that they exist, the process moves to S206, and when it is determined that they do not exist, the process returns to S202. In S206, the apparatus information acquiring unit 120 acquires the apparatus information of the two vehicles 200. The frequency acquiring unit 124 acquires the base station frequency band of the first vehicle 200 and the base station frequency band of the second vehicle 200 among the two vehicles 200.

In S208, the determining unit 130 determines whether or not the base station frequency band of the first vehicle 200 and the base station frequency band of the second vehicle 200 acquired in S206 overlap. When it is determined that they overlap, the process moves to S210, and when it is determined that they do not overlap, the process returns to S202.

In S210, the control unit 140 confirms the vehicle 200 from which transmission of radio signals in the base station frequency band is to be limited among the first vehicle 200 and the second vehicle 200. The control unit 140 may confirm the vehicle 200 based on the communication duration time acquired by the duration time acquiring unit 126. At this time, the control unit 140 may compare the communication duration time (first communication duration time) of the communication terminal 300 in service of the first vehicle 200 and the communication duration time (second communication duration time) of the communication terminal 300 in service of the second vehicle 200, and confirm the vehicle 200 having the shorter communication duration time as the vehicle 200 from which transmission of radio signals is to be limited.

In S212, the control unit 140 limits transmission of radio signals in the base station frequency band by the vehicle 200 from which transmission has been determined to be limited in S210. The control unit 140 may release the limiting in response to the distance between the two vehicle 200 becoming longer than the threshold. The processing shown in FIG. 6 may be ended, for example, by a command from an operator or the like of the wireless base station 100.

Figure 8:
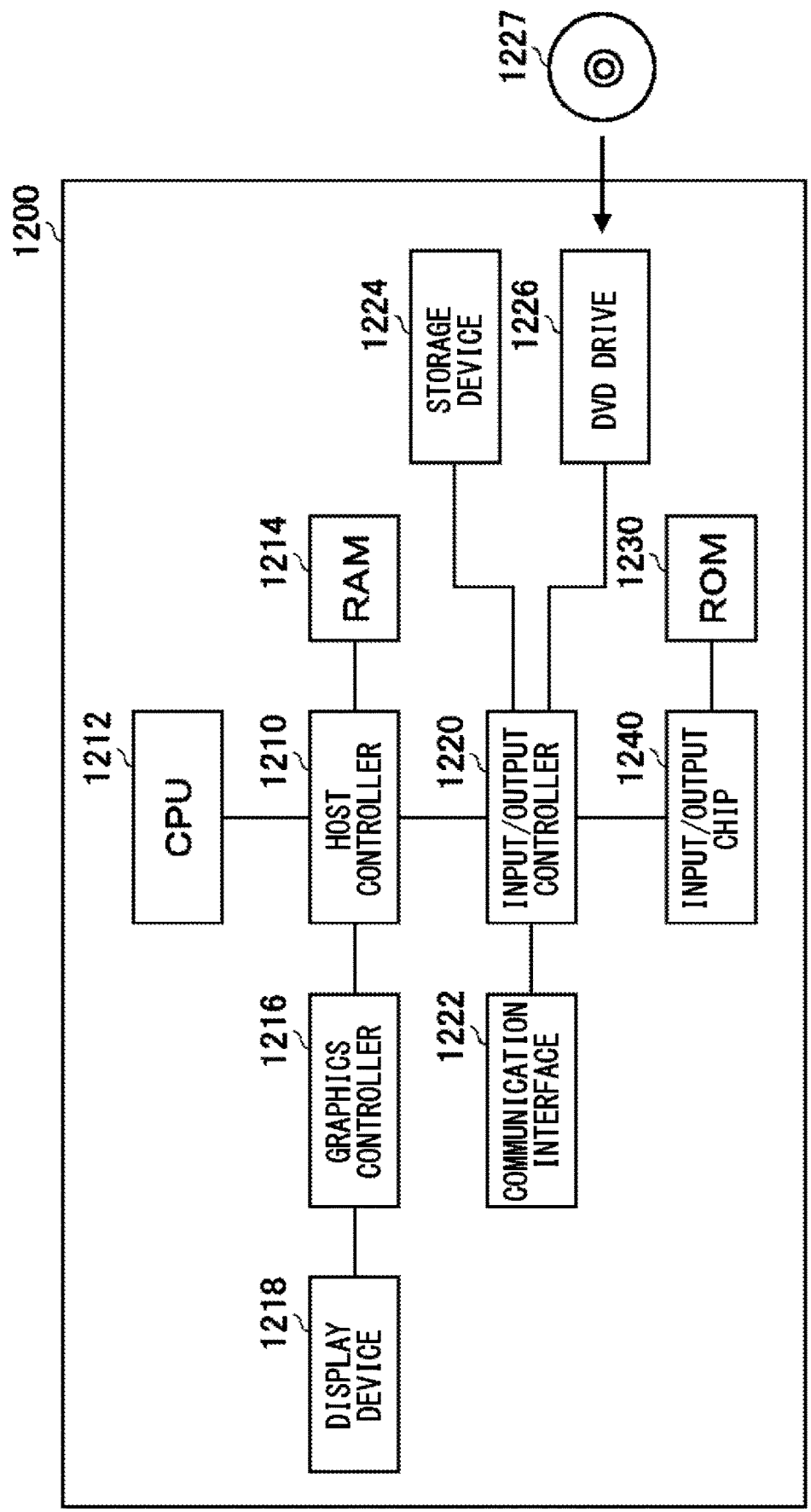
FIG. 8 schematically shows an example of a hardware configuration of a computer 1200 that functions as the wireless base station 100.

FIG. 8 schematically shows an example of a hardware configuration of a computer 1200 that functions as the wireless base station 100. A program installed on the computer 1200 causes the computer 1200 to function as one or more "units" of the apparatus according to the above embodiment, or causes the computer 1200 to perform an operation associated with the apparatus according to the above embodiment or the one or more "units", and/or cause the computer 1200 to perform the process according to the above embodiment or the steps of the process. Such programs may be executed by a CPU 1212 to cause the computer 1200 to perform certain operations associated with some or all of the blocks in the flowcharts and block diagrams described herein.

The computer 1200 according to the present embodiment includes the CPU 1212, a RAM 1214, and a graphics controller 1216, which are interconnected by a host controller 1210. The computer 1200 also includes a communication interface 1222, a storage device 1224, a DVD drive 1226, and an input/output unit such as an IC card drive, which are connected to the host controller 1210 via an input/output controller 1220. The DVD drive 1226 may be a DVD-ROM drive and a DVD-RAM drive or the like. The storage device 1224 may be a hard disk drive and a solid state drive or the like. The computer 1200 may also include a ROM 1230 and a legacy input/output unit such as a touch panel, which are connected to the input/output controller 1220 via the input/output chip 1240.

The CPU 1212 operates according to programs stored in the ROM 1230 and the RAM 1214, thereby controlling each unit. The graphics controller 1216 acquires image data generated by the CPU 1212 on a frame buffer or the like provided in the RAM 1214 or in itself, and causes the image data to be displayed on a display device 1218. The computer 1200 may not include the display device 1218, in which case the graphics controller 1216 causes the image data to be displayed on an external display device.

The communication interface 1222 communicates with other electronic devices via a wireless communication network. The storage device 1224 stores programs and data used by the CPU 1212 within the computer 1200.

The DVD drive 1226 reads the programs or the data from the DVD-ROM 1227 or the like, and provides the storage device 1224 with the programs or the data. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200.

The input/output chip 1240 may also connect various input/output units via a USB port and the like to the input/output controller 1220.

A program is provided by computer readable storage media such as the DVD-ROM 1227 or the IC card. The program is read from the computer readable storage media, mounted onto the storage device 1224, RAM 1214, or ROM 1230, which are also examples of computer readable storage media, and executed by the CPU 1212. The information processing described in these programs is read into the computer 1200, resulting in cooperation between a program and the above-mentioned various types of hardware resources.

An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive 1226 (DVD-ROM 1227), the IC card, etc., and perform various types of processing on the data on the RAM 1214.

The CPU 1212 may then write back the processed data to the external recording medium.

Various types of information, such as various types of programs, data, tables, and databases, may be stored in the recording medium to undergo information processing.

The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby acquiring the attribute value of the second attribute associated with the first attribute satisfying the predetermined condition.

The above-explained program or software modules may be stored in the computer readable storage media on or near the computer 1200. In addition, a recording medium such as a hard disk or a RAM provided in a server system connected to a dedicated communication network or the Internet can be used as the computer readable storage media, thereby providing the program to the computer 1200 via the network.

Blocks in flowcharts and block diagrams in the above embodiments may represent steps of processes in which operations are performed or units of apparatuses responsible for performing operations. Certain steps and units may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits.

Programmable circuitry may include reconfigurable hardware circuits comprising logical AND, OR, XOR, NAND, NOR, and other logical operations, flip-flops, registers, and memory elements, such as field-programmable gate arrays (FPGA), programmable logic arrays (PLA), etc.

Computer-readable storage media may include any tangible device that can store instructions for execution by a suitable device, such that the computer-readable storage medium having instructions stored therein comprises an article of manufacture including instructions which can be executed to create means for performing operations specified in the flowcharts or block diagrams. Examples of computer-readable storage media may include an electronic storage medium, a magnetic storage medium, an optical storage medium, an electromagnetic storage medium, a semiconductor storage medium, etc. More specific examples of computer-readable storage media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY(registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: System; 20: Core network; 100: Wireless base station; 102: Wireless communication area; 120: Apparatus information acquiring unit; 121: Location information acquiring unit; 122: Communication information acquiring unit; 123: Type information acquiring unit; 124: Frequency acquiring unit; 126: Duration time acquiring unit; 127: Movement speed acquiring unit; 128: Movement direction acquiring unit; 130: Determining unit; 140: Control unit; 150: Apparatus type frequency correspondence table; 200: Vehicle; 202: wireless communication area; 210: In-vehicle device; 220: Vehicle; 230: Vehicle; 300: Communication terminal; 321: Communication terminal; 322: Communication terminal; 331: Communication terminal; 400: Base station frequency band; 401, 402, 403, 404, 405, and 406: Wireless resource block; 1200: Computer; 1210: Host controller; 1212: CPU; 1214: RAM; 1216: Graphics controller; 1218: Display device; 1220: Input/output controller; 1222: Communication interface; 1224: Storage device; 1226: DVD drive; 1227: DVD-ROM; 1230: ROM; 1240: Input/output chip

What is claimed is:

1. A communication system comprising:
    a first communication apparatus and a second communication apparatus, each capable of performing wireless communication in a base station frequency band for communication as a mobile base station;
    a frequency acquiring unit that acquires the base station frequency band of the first communication apparatus and the base station frequency band of the second communication apparatus;
    a duration time acquiring unit that acquires a first communication duration time, which is a communication duration time of a communication terminal in service of the first communication apparatus, and a second communication duration time, which is a communication duration time of a communication terminal in service of the second communication apparatus;
    a determining unit that determines whether or not the base station frequency band of the first communication apparatus and the base station frequency band of the second communication apparatus acquired by the frequency acquiring unit overlap; and
    a control unit that limits transmission of radio signals in the base station frequency band by the first communication apparatus or the second communication apparatus based on comparison between the first communication duration time and the second communication duration time when the determining unit determines that the base station frequency band of the first communication apparatus and the base station frequency band of the second communication apparatus overlap, wherein
    the control unit limits transmission of radio signals in the base station frequency band by the second communication apparatus when the first communication duration time is greater than the second communication duration time, and limits transmission of radio signals in the base station frequency band by the first communication apparatus when the first communication duration time is less than the second communication duration time.

2. The communication system according to claim 1, wherein when the determining unit determines that the base station frequency band of the first communication apparatus and the base station frequency band of the second communication apparatus overlap, the control unit limits transmission of radio signals in the entire base station frequency band by the first communication apparatus or the second communication apparatus.

3. The communication system according to claim 1, wherein
    the control unit stops transmission of radio signals in the base station frequency band by the first communication apparatus or the second communication apparatus.

4. The communication system according to claim 1, wherein
    the control unit reduces a transmission output of radio signals in the base station frequency band by the first communication apparatus or the second communication apparatus.

5. The communication system according to claim 1, wherein
the first communication apparatus and the second communication apparatus are movable, and
when a distance between the first communication apparatus and the second communication apparatus is shorter than a predetermined distance, and the determining unit determines that the base station frequency band of the first communication apparatus and the base station frequency band of the second communication apparatus overlap, the control unit limits transmission of radio signals in the base station frequency band by the first communication apparatus or the second communication apparatus.

6. The communication system according to claim 5, wherein
when at least some of a plurality of wireless resource blocks assigned by the first communication apparatus to the communication terminal in service of a wireless communication area that is generated by the first communication apparatus overlap with a plurality of wireless resource blocks assigned by the second communication apparatus to the communication terminal in service of a wireless communication area that is generated by the second communication apparatus, the determining unit determines that a frequency of radio signals transmitted from the first communication apparatus and a frequency of radio signals transmitted from the second communication apparatus overlap.

7. A communication system according to claim 1, wherein comprising:
a first communication apparatus and a second communication apparatus, each capable of performing wireless communication in a base station frequency band for communication as a mobile base station;
a frequency acquiring unit that acquires the base station frequency band of the first communication apparatus and the base station frequency band of the second communication apparatus;
a duration time acquiring unit that acquires a first communication duration time, which is a communication duration time of a communication terminal in service of the first communication apparatus, and a second communication duration time, which is a communication duration time of a communication terminal in service of the second communication apparatus;
a determining unit that determines whether or not the base station frequency hand of the first communication apparatus and the base station frequency band of the second communication apparatus acquired by the frequency acquiring unit overlap; and
a control unit that limits transmission of radio signals in the base station frequency band by the first communication apparatus or the second communication apparatus based on comparison between the first communication duration time and the second communication duration time when the determining unit determines that the base station frequency band of the first communication apparatus and the base station frequency band of the second communication apparatus overlap, wherein
when the control unit is to limit transmission of radio signals in the base station frequency band by the second communication apparatus, the control unit hands over the communication terminal in service of a wireless communication area that is generated by the second communication apparatus to a wireless communication area that is generated by the first communication apparatus, and then limits transmission of radio signals in the base station frequency band by the second communication apparatus.

8. The communication system according to claim 1, wherein
the first communication apparatus is mounted on a first vehicle, and
the second communication apparatus is mounted on a second vehicle.

9. A management apparatus that manages a first communication apparatus and a second communication apparatus, each capable of performing wireless communication in a base station frequency band for communication as a mobile base station, the management apparatus comprising:
a frequency acquiring unit that acquires the base station frequency band of the first communication apparatus and the base station frequency band of the second communication apparatus;
a duration time acquiring unit that acquires a first communication duration time, which is a communication duration time of a communication terminal in service of the first communication apparatus, and a second communication duration time, which is a communication duration time of a communication terminal in service of the second communication apparatus;
a determining unit that determines whether or not the base station frequency band of the first communication apparatus and the base station frequency band of the second communication apparatus acquired by the frequency acquiring unit overlap; and
a control unit that limits transmission of radio signals in the base station frequency band by the first communication apparatus or the second communication apparatus based on comparison between the first communication duration time and the second communication duration time when the determining unit determines that the base station frequency band of the first communication apparatus and the base station frequency band of the second communication apparatus overlap, wherein
the control unit limits transmission of radio signals in the base station frequency band by the second communication apparatus when the first communication duration time is greater than the second communication duration time, and limits transmission of radio signals in the base station frequency band by the first communication apparatus when the first communication duration time is less than the second communication duration time.

10. The management apparatus according to claim 9, wherein
the first communication apparatus and the second communication apparatus are movable, and
when a distance between the first communication apparatus and the second communication apparatus is shorter than a predetermined distance, and the determining unit determines that the base station frequency band of the first communication apparatus and the base station frequency band of the second communication apparatus overlap, the control unit limits transmission of radio signals in the base station frequency band by the first communication apparatus or the second communication apparatus.

11. A non-transitory computer-readable storage medium having stored thereon a program for causing a computer that manages a first communication apparatus and a second communication apparatus, each capable of performing wireless communication in a base station frequency hand for communication as a mobile base station to function as:

a frequency acquiring unit that acquires the base station frequency band of the first communication apparatus and the base station frequency band of the second communication apparatus;

a duration time acquiring unit that acquires a first communication duration time, which is a communication duration time of a communication terminal in service of the first communication apparatus, and a second communication duration time, which is a communication duration time of a communication terminal in service of the second communication apparatus;

a determining unit that determines whether or not the base station frequency band of the first communication apparatus and the base station frequency band of the second communication apparatus acquired by the frequency acquiring unit overlap; and a control unit that limits transmission of radio signals in the base station frequency band by the first communication apparatus or the second communication apparatus based on comparison between the first communication duration time and the second communication duration time when the determining unit determines that the base station frequency band of the first communication apparatus and the base station frequency band of the second communication apparatus overlap, wherein the control unit limits transmission of radio signals in the base station frequency band by the second communication apparatus when the first communication duration time is greater than the second communication duration time, and limits transmission of radio signals in the base station frequency band by the first communication apparatus when the first communication duration time is less than the second communication duration time.

* * * * *